US005796382A

United States Patent [19]
Beeteson

[11] Patent Number: 5,796,382
[45] Date of Patent: Aug. 18, 1998

[54] LIQUID CRYSTAL DISPLAY WITH INDEPENDENTLY ACTIVATED BACKLIGHT SOURCES

[75] Inventor: John S. Beeteson, Skelmorlie, Scotland

[73] Assignee: International Business Machines Corporation, Armonk, N.Y.

[21] Appl. No.: 594,188

[22] Filed: Jan. 31, 1996

[30] Foreign Application Priority Data

Feb. 18, 1995 [GB] United Kingdom ............... 9503227

[51] Int. Cl.$^6$ ................... G09G 3/36; G06F 1/32
[52] U.S. Cl. .................. 345/102; 345/170; 345/172; 349/61; 349/68
[58] Field of Search .................. 345/102, 170, 345/172; 349/56, 61, 68, 69; 368/67, 69, 84, 227, 242; 362/84, 225; 364/707; 395/750.05, 750.06

[56] References Cited

U.S. PATENT DOCUMENTS

| 5,225,822 | 7/1993 | Shiraishi et al. | 345/102 X |
| 5,315,695 | 5/1994 | Saito et al. | 345/102 X |
| 5,396,443 | 3/1995 | Mese et al. | 364/707 |
| 5,412,396 | 5/1995 | Nelson | 345/102 X |
| 5,428,366 | 6/1995 | Eichenlaub | 345/102 |
| 5,440,324 | 8/1995 | Strickling, III et al. | 345/102 |
| 5,454,112 | 9/1995 | Kadono et al. | 395/750 |
| 5,479,187 | 12/1995 | Chen | 345/102 |
| 5,598,565 | 1/1997 | Reihardt | 395/750 |

Primary Examiner—Steven Saras
Assistant Examiner—Seth D. Vail
Attorney, Agent, or Firm—Scully, Scott, Murphy & Presser

[57] ABSTRACT

A liquid crystal display 10 is backlit by more than one light source 20 which is operated independently. Selective usage of the light sources extends the useful operating time of batteries when the liquid crystal display is used with a portable computer system.

9 Claims, 1 Drawing Sheet

1
LIQUID CRYSTAL DISPLAY WITH INDEPENDENTLY ACTIVATED BACKLIGHT SOURCES

BACKGROUND OF THE INVENTION

1. Field of the Invention

The present invention relates to a liquid crystal display. More particularly the invention relates to a liquid crystal display (LCD) which may be used with a portable computer and to a method and apparatus for extending the useful operating time of a battery in an LCD portable computer.

2. Discussion of the Prior Art

Liquid crystal displays operate on the principle that when an electric charge is passed between two parallel, transparent surfaces that contain liquid crystal, the crystal will align itself with the surfaces. In known LCDs a grid or matrix of electrodes is located across the display area to control orientation of the crystals. LCDs are also known in which a grid or matrix of electrodes is located around the edge of the display and enables current to be applied to predetermined pixel areas of the display to selectively orientate the crystals. In both types of LCD it is necessary to illuminate the display panel.

One such example of such a display is used with the IBM ThinkPad portable computer. This computer typically uses a 10.8 Volt 2.9 AH battery which achieves a useful operating life of about 3.8 hours. This operating time includes full power management techniques. The average operating power using the battery is 8.25 Watts compared to 25 Watts when connected to an external power supply. Of this 8.25 Watts up to 4 Watts can be consumed by the LCD backlight and even more with colour versions of the display.

SUMMARY OF THE INVENTION

Extending the useful operating time and reducing battery weight is a major factor in the design of portable computers. Accordingly, viewed from one aspect the present invention provides a display unit comprising: a liquid crystal display panel; at least two light sources for backlighting the liquid crystal display panel; characterised in that at least one of the light sources may be activated independently of the other light sources thereby enabling portions of liquid crystal material in the display panel to be illuminated selectively.

A typical application is for the user of a portable computer to type in minutes of a meeting, or to type a report or a short memo. Such applications can save the user time when he gets home or back to his workplace and ensure that thoughts are entered while they are fresh on the mind. However the majority of the time spent in this sort of application is just power typing, and in this activity the user will only need to see the whole page when reviewing the document. So although only a small section of the LCD display is actually needed, the whole surface is active and being illuminated by expensive battery power.

The present invention provides a power management technique which recognizes "non useful" power states, and turns facilities off until really needed. "Power Typing" is an application state to which power management may be applied.

BRIEF DESCRIPTION OF THE DRAWINGS

In order that the invention may be fully understood a preferred embodiment thereof will now be described, by way of example only, with reference to the accompanying drawings in which.

DETAILED DESCRIPTION OF THE INVENTION

Figure 1:
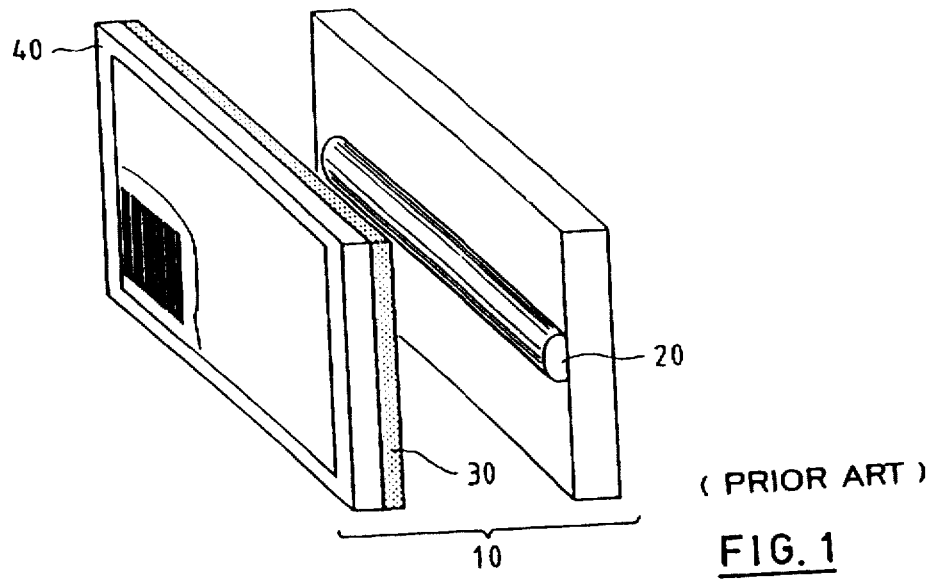
FIG. 1 shows a conventional liquid crystal display.

FIG. 1 shows a schematic view of a conventional liquid crystal display. In operation an electric charge is passed between the two parallel surface plates of the screen 40 which contain liquid crystal material to cause the crystal to align itself with the surfaces. The crystal has a natural polarizing effect on the light and a 90 degree twist—which happens when the current is passed through the surrounding surfaces—causes the light to twist. This twisting effect is combined with a static polarizing layer to affect the amount of light which passes through the crystal. The effect of the crystal twisting 90 degrees is that it blocks light from passing through the crystal and causes that area to change from white (transparent) to black. The angle of polarization may be varied by varying the voltage thereby enabling increments of light or greyscales to be created. This is known as the twisted nematic effect of liquid crystals. The present invention is also applicable to Super-Twisted-Nematic (STN) LCDs. This technology uses birefringent crystals that have the ability to twist through even wider angles. Birefringent crystals can twist through between 180 and 260 degrees. An advantage of STN displays are that they have lower power consumption.

The typical LCD panel 10 shown in FIG. 1 is backlit by a single lamp 20. In some LCDs the lamp is located centrally and in others it is located at the side. It is also known to utilize more than one lamp. Light output from the lamp or lamps is normally spread out evenly over the LCD surface by some form of spreader or diffuser 30. If there is more than one lamp they are always connected in parallel so that the whole LCD surface is evenly illuminated.

Figure 2:
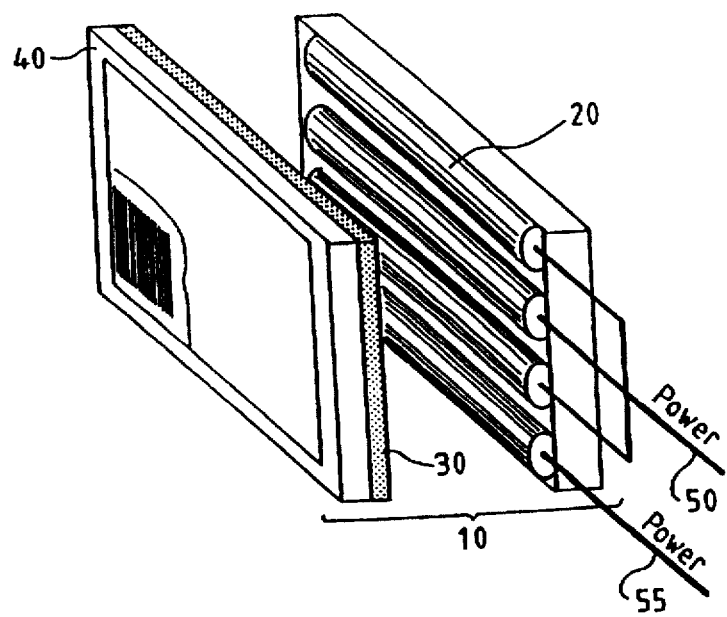
FIG. 2 shows a liquid crystal display in accordance with the present invention.

FIG. 2 shows an LCD panel in accordance with the present invention wherein more than one lamp is provided for backlight. Four lamps 20 are shown in the embodiment of FIG. 2 but the minimum number should be two. At least one of the lamps is independently controlled from the others. The independently controlled lamp has a separate power line 55 to the battery (not shown), whereas the other lamps share a power line 50 to the battery. The lamps may be electroluminescent panels, incandescent sources, light emitting diodes or even plasma discharge panels to mention a few examples.

In accordance with a preferred embodiment of the present invention an application input mode is defined (for example by a window icon or a function key) as "Power Typing" and in this mode three of the backlight lamps are turned off leaving only one lamp to illuminate ¼ of the LCD screen and hence typically show 10 lines of text to the user. It is necessary to tailor the application to synchronize to this mode so that just the bottom ten lines for example of the screen are used until the normal mode is re-commanded.

In accordance with another embodiment of the invention the lamps could be switched by an extension of conventional circuits. The power line 50 from the bank of the three lamps is taken to a switch on the front panel of the display to allow the user to control the function. Application windows can easily be resized to the lower height needed when only one light is in use. An advantage of this manual mode of operation is that no changes are required to the microprocessor circuits within the computer or to the software.

From this basic embodiment, various degrees of automation can be devised. Examples includes:

1. Programming a function key, by the application, by a device driver or by BIOS, to initiate the lamp switching.
2. Extending the function key approach to also resize the application window.
3. Having a facility in the application (or operating system) to use the minimize button—or a new button—to resize the window and, at the same time, to signal via a micro output port to switch the lamps.
4. Supplying a "miniature application" via a device driver to place an on screen icon to initiate window resizing and lamp switching.

In the ThinkPad 700 example discussed previously, if the backlight power was reduced from 4 to 1 Watt during "Power Typing" mode, then the useful operating life would extend from 3.8 hours to nearly 6 hours while in this mode.

I claim:

1. A display unit comprising:
   a liquid crystal display panel;
   at least two light sources for backlighting the liquid crystal display panel;
   at least one of the light sources being activated independently of the other light source to constantly illuminate selected portions of liquid crystal material in the display panel.

2. A display unit as claimed in claim 1 wherein the liquid crystal display panel comprises:
   a layer of liquid crystal material positioned between a front transparent electrode and a back transparent electrode; and
   means for selectively applying an electric field across predetermined areas of the layer of liquid crystal material.

3. A computer system comprising:
   a central processing unit;
   a keyboard; and
   a display unit as claimed in claim 2.

4. A computer system comprising:
   a central-processing unit;
   a keyboard; and
   a display unit as claimed in claim 1.

5. A computer system as claimed in claim 4 wherein the light sources are activated independently by means of a programmed function key on the keyboard.

6. A computer system as claimed in claim 4 wherein the light sources are activated independently by means of an on screen icon.

7. A computer system as claimed in claim 1 wherein a window displayed on the display unit is resized so that it remains visible when one of the light sources has been selectively disabled.

8. A computer system comprising:
   a central processing unit;
   a keyboard; and
   a display unit comprising;
   a liquid crystal display panel;
   at least two light sources for backlighting the liquid crystal display panel, at least one of the light sources being activated independently of the other light source by means of a manually operated switch located on the computer system, thereby enabling portions of liquid crystal material in the display panel to be illuminated selectively.

9. A computer system comprising:
   a central processing unit;
   a keyboard; and
   a display unit comprising;
   a liquid crystal display panel;
   at least two light sources for backlighting the liquid crystal display panel;
   at least one of the light sources being activated independently of the other light source thereby enabling portions of liquid crystal material in the display panel to be illuminated selectively;
   wherein a window displayed on the display unit is resized so that it remains visible when one of the light sources has been selectively disabled.

* * * * *